United States Patent [19]

Mattesky et al.

[11] Patent Number: 5,854,306
[45] Date of Patent: Dec. 29, 1998

[54] WEAR RESISTANT IMAGE PRINTING ON LATEX SURFACES

[75] Inventors: Henry Mattesky, Cedar Grove; James Gugger, Roselle Park, both of N.J.

[73] Assignee: Herbert Glatt, Morristown, N.J.

[21] Appl. No.: 875,414

[22] PCT Filed: Jan. 5, 1996

[86] PCT No.: PCT/US96/00163

§ 371 Date: Jul. 8, 1997

§ 102(e) Date: Jul. 8, 1997

[87] PCT Pub. No.: WO96/21701

PCT Pub. Date: Jul. 18, 1996

[51] Int. Cl.⁶ .............................. C03C 17/00; C09D 5/00; C09D 11/00; D06N 7/04
[52] U.S. Cl. .................... 523/160; 101/491; 106/20 R; 106/23 R; 523/161; 428/147; 524/77; 524/474; 524/476; 525/123; 525/332.7; 427/372.2; 427/385.5; 427/393.5
[58] Field of Search ..................... 523/160, 161; 525/123, 332.7; 428/147; 524/77, 474, 476; 101/491; 106/20 R, 23 R; 427/372.2, 385.5, 393.5

[56] References Cited

U.S. PATENT DOCUMENTS

| | | | |
|---|---|---|---|
| 2,289,638 | 7/1942 | Erickson et al. | 524/386 |
| 4,606,769 | 8/1986 | Tanaka et al. | 524/571 |
| 5,391,685 | 2/1995 | Hitomi et al. | 523/160 |

*Primary Examiner*—Patrick D. Niland
*Attorney, Agent, or Firm*—Omri M. Behr, Esq.

[57] ABSTRACT

There is provided a method and novel formulations for printing images on a latex rubber surface. An ink containing natural or synthetic rubber, a pigment dispersion, and an aromatically unsaturated solvent medium for said rubber is used. The stability of the image is improved providing to the rubber molecules of the ink, an agent, such as an aryl diisocyanate, that will form a tough, flexible, chemically resistant matrix between the rubber molecules of the ink, the base coat, where present and the latex surface. A base coat may be used upon the latex surface to anchor the printing ink thereto. This base coat can comprise a natural rubber in an aromatically unsaturated solvent and may also contain the aryl diisocyanate. The method may be improved by certain post printing steps such as heating and curing the printed product.

35 Claims, No Drawings

WEAR RESISTANT IMAGE PRINTING ON LATEX SURFACES

FIELD OF THE INVENTION

The printing of rubber articles made from rubber latex.

DISCUSSION OF THE PRIOR ART

The printing of rubber articles made from rubber latex, in particular natural rubber latex, is well known in the art. Balloons have been printed using natural rubber solutions in mineral spirits. These solutions yield a print which can be easily removed by common household detergents and chemicals.

Ink systems for latex rubber, in particular natural latex articles and, more specifically, latex rubber gloves require a degree of chemical resistance not found commercially today. Rubber gloves commonly are exposed to a variety of household chemicals including detergents, bleach, ammonia, oils and grease, polishes, disinfectants, etc. Any decorative system for rubber gloves should be resistant to these common materials. It would therefore be desirable to provide a decorative technique which comprises a printing system for the surface of such rubber articles wherein the printed image is resistant to common household chemicals.

SUMMARY OF THE INVENTION

There is provided a method for printing images on a latex rubber surface which comprises applying an ink containing natural or synthetic rubber, pigment dispersion, and a solvent medium, in particular an aromatically unsaturated solvent medium for said rubber.

A critical feature of the invention is the presence of an agent capable upon cure, of forming a chemically and abrasion resistant, tough flexible structure integrating the rubber of said base coat, where it is present, the rubber of the ink, together with the pigment therein, and the rubber of the latex surface, in at least one of the base coat and the ink. The mechanism if this integration is not fully understood, but its creation of a surprising level of resistance thereby is unquestionably novel.

The preferred integrating agent is, suitably an aryl diisocyanate. Where the rubber containing ink is used over a base coat of natural rubber in such a solvent, the aryl diisocyanate may be either in the base coat or the ink.

A base coat of natural rubber in such a suitable solvent is required, where the rubber in the ink is synthetic rubber. The integrating agent, such as an aryl diisocyanate may be either in the base coat or the ink. However, a portion of the solvent may be replaced by a terpene, a terpenoid or a high boiling ketone suitably having a boiling point over 120° C., such as isophorone or the like.

The efficacy of the printing may be improved by certain pre- and post-printing steps. One such additional step, is heating the printing surface. Another, highly desirable, added step, is placing a base coat upon the printing surface that receives the image. In one embodiment of the process, this base coat is allowed to dry to tackiness before the image is printed. As stated above, this base coat comprises natural rubber in an aromatically unsaturated solvent.

The ink as well as the base coat may be applied using a number of common printing techniques including: gravure printing, flexo printing, screen printing, and pad printing. Pad printing however, has been found to be superior for the inventive purposes, such as: printing individual rubber articles like rubber gloves.

DESCRIPTION OF THE PREFERRED EMBODIMENTS

There is provided a method and a formulation for printing images on latex rubber surfaces. It is desirable that the weight amount of the aryl diisocyanate is between 0.5 and 3.0 times that of the total rubber in solution within the ink or within the base coat where used or both. The rubber may be natural rubber or synthetic rubber. Suitably, the diisocyanate is selected from the group consisting of toluene-, methylene diphenyl- and polymeric methylene diphenyl diisocyanates, and mixtures thereof.

The rubber in the ink may be natural rubber or synthetic rubber such as neoprene rubber or blends thereof. For good printing, the ink, at printing time, should have a viscosity at 20° C. of between 800 and 3000 cps. The use of synthetic rubber in the ink is preferred over natural rubber since its chemical resistance is greater. However natural rubber, when mixed with aryl diisocyanate will provide sufficient resistivity. Aryl diisocyanate when cured per se will form a hard brittle product, In the presence of rubber, it becomes integrated therewith to yield a flexible, tough, and chemically resistant structure or matrix, that provides the unique printing product associated with this invention.

Inks containing the diisocyanate should be promptly used after mixing, suitably within 10 hours of preparation.

Prior art printing solvents generally use mineral spirits, such as: aliphatic or alicyclic hydrocarbons. In contrast, the solvents used in the inks and precoat of the invention, are aromatically, unsaturated solvents. Aliphatic esters of aromatic acids, or higher liquid aromatic hydrocarbons are preferred. Especially suitable, is methyl naphthalene. The latter may, under certain conditions, be partially replaced with terpenes, or terpenoids, such as: dilimonene, or high boiling ketones, such as: isophorone. The methyl naphthalene, however, is preferred. Glidsol 90, manufactured by SCM Glisol Organics, 210 Summit Ave., Montvale N.J. 07645, is a terpene formulation that is especially preferred. Terpenes and terpenoids can be used in the base coat, but this is not preferred. It should be noted, that commercial methyl naphthalene, is in fact, a complex mixture containing dimethyl naphthalene, ethyl methyl naphthalene, and other heavy, fractional coal tar components.

The actual amounts of rubber, solvents, and pigments used in the printing formulations of this invention, may vary quite substantially depending on the desired consistency and drying speed. The desired ink viscosity range at 20° C., is approximately between 800 and 3,000 cps. Approximately between 5 and 40 wt % of pigment is contained in the ink composition.

The image to be printed on a latex rubber surface in accordance with the ink formulation of this invention, is not particularly dependent upon any conventional printing method. Stability of the image is improved by the additional step of heating the printed surface. Suitably, the heating is accomplished in a temperature range of from approximately 95° to 130° C. for 10 to 20 minutes, or approximately from 190° to 230° C. for 3 to 8 seconds.

Heat curing can increase the chemical and abrasive resistance of the printed ink image to the commonly used, household cleaner, Pine Sol®. A simple test of ink image endurance is to rub the printed image with a pad impregnated with Pine Sol at recommended, household detergent strength. Resistance of Neoprene, and natural rubber-containing inks of this invention, are capable of withstanding 35 to 100 rubs. This is achievable with the inventive ink formulations due to the presence of the aryl diisocyanate, which as aforementioned, intimately embeds within the rubber molecules.

The resistance of the printed image may also be improved by certain pre-, and post-printing steps. Washing the surface of the article with water and surfactant, followed by drying; or just washing the surface with a hydrocarbon solvent, will improve the printing process. The washing procedure, however, is not recommended for gloves containing flock on their inner surfaces. Heating the printed image for approximately 3 to 6 seconds at approximately between 190°–220° C., is helpful.

One of the unusual, and totally unexpected aspects of this invention, is the ability of the printed image product to become increasingly resistant to chemical attack and abrasion with time. It has been observed that while the printed image product is contact stable immediately after the initial heating step, the resistance to chemical abrasion continues to build towards a maximum over an extended period at ambient temperature. Testing reveals that the printed image product reaches maximum efficacy between 20 and 60 days after printing. This slow cure does not pose a marketing problem, however, because the mean time between manufacture and the arrival at the point of sale of a typical printed latex rubber glove, is usually about 75 days.

Printed image stability is also improved by placing a base coat upon the surface receiving the printed image. The base coat is applied and allowed to dry until tacky. The image is then printed upon the tacky base coat surface. The base coat can comprise natural rubber in an aromatically unsaturated solvent. Suitably, this base coat also contains an aryl diisocyanate, in an approximate weight amount of between 0.5 and 3.0 times that of the rubber in solution.

One method of printing an image on a latex rubber surface includes preparing a clear base coat solution, comprising natural rubber of approximately one to ten parts by weight in an aromatic hydrocarbon solvent of approximately 45 to 50 parts by weight. This clear base coat solution is then admixed with a premixed moiety comprising an aromatic hydrocarbon solvent of approximately between 2 to 15 parts by weight containing an aryl diisocyanate of approximately 1 to 30 parts by weight. The above admixture is then mixed with a pigment having an approximate weight of between 0.3 to 5.0 times that of the rubber in solution. The components of this formulation, viz., the clear coat, the premix, and the pigment, are mixed at ambient temperature, and then printed upon the latex rubber surface preferably within 10 hours of the mixing.

A generally preferred method of printing an image on a latex rubber surface comprises the step of applying a base coat to the rubber surface containing natural rubber in approximate range by weight of between 5 to 15 parts in a solvent approximately ranging in weight between 80 to 120 parts, and an aryl diisocyanate ranging in weight between 0 to 45 parts. The image is then printed onto the base coat utilizing an ink whose formulation comprises natural or synthetic rubber in approximately 1 to 10 parts by weight; a rubber solvent in the approximate weight of between 30 to 60 parts; a pigment of approximately 0.3 to 5.0 times the weight of the rubber; and an aryl diisocyanate in the weight range of approximately 0 to 30 parts.

The rubber solvent in the aforesaid formulation can be an aromatic hydrocarbon, a terpene, a terpenoid, a ketone boiling above 120° C., or a mixture thereof. The rubber solvent in the base coat may be an aromatic hydrocarbon solvent comprising approximately 60 to 90 parts by weight, a terpene, or terpenoid solvent in approximate weight of between 0 to 60 parts. The rubber solvent in the ink may be an aromatic hydrocarbon solvent comprising approximately 30 to 50 parts by weight, and a terpene or terpenoid solvent of approximately 0 to 30 parts by weight.

Various combinations of base coat and ink compositions are within the scope of the present invention. In one embodiment, the ink comprises synthetic rubber in approximately 1 to 10 parts by weight; an aromatic hydrocarbon solvent in about 30 to 80 parts by weight; and a pigment that is 0.3 to 5 parts by weight. The base coat can comprise natural rubber in approximate weight of between 5 to 15 parts; an aromatic hydrocarbon solvent in approximately 80 to 120 parts by weight; and an aryl diisocyanate in approximate weight of between 1 to 45 parts.

In another embodiment the ink comprises synthetic rubber in approximate weight of between 1 to 10 parts; an aromatic hydrocarbon solvent of approximately 30 to 60 parts by weight; a pigment in approximate weight of between 0.3 to 5.0 parts; and an aryl diisocyanate approximately 1 to 30 parts by weight. The base coat can comprise natural rubber approximately 5 to 15 parts by weight in an aromatic hydrocarbon solvent comprising approximately 80 to 120 parts by weight.

In a further embodiment the ink comprises synthetic rubber in about 1 to 10 parts by weight; an aromatic hydrocarbon solvent approximately 15 to 60 parts by weight; a terpene, or terpenoid solvent in approximate weight range of 5 to 40 parts; and a pigment approximately 0.3 to 5.0 parts by weight. The base coat comprises natural rubber approximately between 5 to 15 parts by weight; an aromatic hydrocarbon solvent in an approximate weight range of between 80 to 120 parts; and an aryl diisocyanate of about 1 to 45 parts by weight.

In yet another embodiment the ink comprises synthetic rubber in approximate weight range of 1 to 10 parts; an aromatic hydrocarbon solvent of about 15 to 60 parts by weight; a terpene, or terpenoid solvent of approximately 5 to 40 parts by weight; a pigment in a weight range of between 0.3 to 5.0 parts, and an aryl diisocyanate in approximate weight of between 1 to 30 parts. The base coat comprises natural rubber from approximately 5 to 15 parts by weight in an aromatic hydrocarbon solvent of about 80 to 90 parts by weight.

It is to be reiterated, that the aromatic hydrocarbon of choice in the above formulations, is commercial grade methyl naphthalene.

EXAMPLES

Printing Methodology

A series of printing stations each comprise pad printer. The printing stations are aligned to provide sequential processing. A first printing station is charged with the base coat, and the pigmented printing ink is charged to the second printing station. A number of colors may be printed by placing additional pad printing stations in line all subsequent to the first base coat printer. It has been found that improved results are obtained by not allowing the base coat to thoroughly dry before the pigmented ink is applied. A slight base coat tackiness should remain as the rubber glove passes under subsequent print stations. Heat is applied to the print surface by contact heating with a teflon coated aluminum plated heater to an approximate temperature of 215° C. for five seconds. The heating procedure assists in the cure of the printing ink, which effects its ability to resist chemical attack and abrasion.

Additional improvement is obtained by placing the rubber gloves in an oven heated to 120° C. for approximately fifteen minutes.

Stability Test

A test was developed to compare the ability of ink formulations to withstand exposure to common household chemicals. It was found that Pine Sol®, manufactured by IMFC by Clorox Co., Oakland, Calif., most readily attacked rubber ink systems. A 50% solution of Pine Sol® in water was applied to a commercial paper towel. The saturated paper towel was rubbed across the print surface applying moderate hand pressure. The number of rubbing cycles that would erase the image was recorded. Each rubbing cycle consisted of a back-and-forth rubbing motion comprising 4 cm. in length. As an example, a printed image that comprises a balloon ink was found to disappear in as little as one cycle.

In the subsequent Tables of Results, certain abbreviations are used:

SMRL: Standard Malaysian Rubber Light ( Latex); Alcan Rubber & Chemical Inc., New York N.Y.
DABCO T-12 (Dibutyltin Dilaurate): Air Products & Chemicals Inc., Allentown Pa.
PAPI 2021: polymethylene polyphenyl isocyanate mfg. by Dow Chemical Company, Plastids Div., Midland Mich..
Di-XXXX Pigments: 25% Pigment, 75% Dinonyl Phthalate; Mfg by Cardinal Color Inc., Paterson N.J. 07524
NEOPRENE GW: Dupont Co., Elastomer Div., Wilmington Del.
STALITE S: R. T. Vanderbilt, Norwalk, Conn.

Solutions were prepared using a Versamix mixer model MW5 of one gallon capacity obtained from Ross & Co., Long Island, N.Y. Mixing was accomplished using a slow agitation speed setting for five days.

As used in these Tables of Results and the claims herein, the term: "parts*" refers to parts by weight not proportions. The total for any composition may be more or less than 100.

EXAMPLE I

A printing ink is prepared as follows:

|   | PARTS* |
|---|---|
| Neoprene GW | 17.0 |
| Methyl Naphthalene #5 | 41.33 |
| Limonene 145 | 41.33 |
| Pigment Dispersion: Blue Di-6112 | 20.0 |
| Agerite Stalite | 0.34 |
| Total | 120 |

An image was imprinted upon a latex surface using the above formulation. The aforementioned rubbing test was performed using pads impregnated with Pine Sol®. The test was conducted 12 days after printing. The printed image was air cured. Only one rub was required to remove the a image.

EXAMPLE II

In the ink formulation given in Example I, 17 parts of PAPI 2020 were added to the ink. After printing an image upon a latex surface, a Pine sol® test was performed after 12 days. The printed image was air cured at ambient. It required 6 rubs to erase the image.

EXAMPLE III

A base coat is prepared as follows:

|   | PARTS* |
|---|---|
| Std. Malaysian Rubber Light (SMRL) | 8.85 |
| Dabco T12 | 0.6 |
| Methyl Naphthalene #5 | 91.15 |
| Total | 100.57 |

The above base coat was applied to a natural rubber surface just prior to application of the ink shown in Example II. A Pine sol® rubbing test was performed after 1 2 days. It took approximately between 1 2 to 22 rubs to remove the printed image. This test was additionally performed using a cure of 60 days. The image required 40 rubs for removal.

EXAMPLE IV Natural rubber ink

To the composition of Example III was added

| PAPI 2020 | 8 parts |
|---|---|
| Blue Di-6112 | 20 parts |

The Pine sol® rubbing Test was performed after the printed image was allowed to cure for 9 days. The image was removed after 16 rubs.

EXAMPLE V

An ink of Example IV was applied over a base coat of Example III.

The Pine sol rubbing test was performed after 9 days cure of the printed image. It took 36 rubs to remove the printed image.

EXAMPLE VI

Further Test results: STANDARD 4 COLOR RUBBER INK FORMULATIONS

|   | CLEAR | BLACK | YELLOW | RED | BLUE | BASE |
|---|---|---|---|---|---|---|
| Me. Naphthalene #5 | 44.9 | | | | | |
| SMRL | 4.8 | | | | | |
| Dabco T-12 | 0.3 | | | | | |
| TOTAL | 50.0 | | | | | |
| Clear | | 50.0 | 50.0 | 50.0 | 50.0 | 50.0 |
| Yellow DI-4225 | | 0 | 10.0 | 0 | 0 | 0 |
| Red DI-2023 | | 0 | 0 | 10.0 | 0 | 0 |
| Blue-DI 6112 | | 0 | 0 | 0 | 10.0 | 0 |
| Black DI-9017 | | 4.0 | 0 | 0 | 0 | 0 |
| Me. Naphthalene #5 | | 9.3 | 4.3 | 4.3 | 9.3 | 4.3 |
| PAPI (2021) | | 4.3 | 4.3 | 4.3 | 4.3 | 4.3 |
| TOTAL PARTS* | | 67.6 | 68.6 | 68.6 | 73.6 | 58.6 |

All colours printed together in a design pattern.
Cure time: 60 days.
Pine sol test: More than 40 rubs to failure

EXAMPLE VII

NATURAL RUBBER INKS - NO BASE

|  | I-92 | A-92 | B-92 | H-92 |
|---|---|---|---|---|
| SMRL | 4.425 | 4.425 | 4.425 | 4.425 |
| Methyl Naphthalene #5 | 45.58 | 45.58 | 45.58 | 45.58 |
| DABCO T-12 | 0.3 | 0.3 | 0.3 | 0.3 |
| Methyl Naphthalene #5 (Premix) | — | 0.5 | 3.0 | 15.0 |
| PAPI 2020 (Premix) | — | 0.5 | 3.0 | 15.0 |
| Blue DI-6112 | 10.0 | 10.0 | 10.0 | 10.0 |
| TOTAL PARTS* | 60.306 | 61.305 | 66.305 | 90.305 |
| % SMRL NR-PAPI 2020 Ratio | — | 8.85:1.0 | 1.48:1.0 | 0.3:1.0 |
| PINE SOL TEST RESULTS (time of cure/rubs to failure) | | | | |
| 5 DAYS | | 6 | 6 | 12 | 3 |
| 15 DAYS | 9 | 15 | 16 | 15 |
| 30 DAYS | 10 | 20 | 20 | 20 |
| Air Cure, Hot Stamp, 200° C., 3 sec | | | | |

EXAMPLE VIII

NATURAL RUBBER INK WITH BASE COAT

|  | base coat | A-92 | B-92 | H-92 |
|---|---|---|---|---|
| SMRL | 4.425 | 4.425 | 4.425 | 4.425 |
| Methyl Naphthalene #5 | 45.58 | 45.58 | 45.58 | 45.58 |
| DABCO T-12 | 0.3 | 0.3 | 0.3 | 0.3 |
| Methyl Naphthalene #5 (Premix) | — | 0.5 | 3.0 | 15.0 |
| PAPI 2020 (Premix) | — | 0.5 | 3.0 | 15.0 |
| Blue DI-6112 | | 10.0 | 10.0 | 10.0 |
| TOTAL PARTS* | 50.306 | 61.305 | 66.305 | 90.305 |
| % SMRL NR-PAPI 2020 Ratio | — | 8.85:1.0 | 1.48:1.0 | 0.3:1.0 |
| PINE SOL TEST RESULTS (time of cure/rubs to failure) | | | | |
| 5 DAYS | | 12 | 18 | 15 |
| 15 DAYS | | 34 | 36 | 19 |
| 30 DAYS | | 30 | 35 | 30 |
| Air Cure, Hot Stamp, 200° C., 3 sec | | | | |

EXAMPLE IX

STANDARD NEOPRENE INK FORMULATIONS

|  | CLEAR | BLACK | YELLOW | RED | BLUE | BASE |
|---|---|---|---|---|---|---|
| Methyl Naphthalene #5 | 44.9 | | | | | |
| Natural Rubber, SMRL | 4.8 | | | | | |
| Dabco T-12 | 0.3 | | | | | |
| (Clear) | 50.0 | 50 | 0 | 0 | 0 | 0 |
| Methyl Naphthalene #5 | 24.80 | | | | | |
| Limonene 145 | 16.53 | | | | | |
| Neoprene GW | 8.50 | | | | | |
| Agerite Stalite S | 0.17 | | | | | |
| (Neoclear) | 50.0 | 0 | 50.0 | 50.0 | 50.0 | 50.0 |
| Yellow DI-4225 | | 0 | 10.0 | 0 | 0 | 0 |
| Red Di-2023 | | 0 | 0 | 10.0 | 0 | 0 |
| Blue DI-6112 | | 0 | 0 | 0 | 10.0 | 0 |
| Black DI-9017 | | 4.0 | 0 | 0 | — | 0 |
| Methyl Naphthalene #5 | | 8.6 | 8.6 | 8.6 | 8.6 | 4.3 |
| PAPI) | | 0 | 0 | 0 | 0 | 4.3 |
| TOTAL PARTS* | 62.6 | 68.6 | 68.6 | 68.6 | 68.6 | 58.6 |

The above inks were printed together in a design pattern over a base coat as described in the second portion of Example VIII above.

Curing Time was 60 days. A rubbing Pine sol® test required 40 rubs to remove the printed image.

EXAMPLE X

AIR CURE, HOT STAMP, 200° C., 3 sec.

BASE COAT:

| | |
|---|---|
| SMRL | 8.85 |
| Methyl Naphthalene #5 | 91.15 |
| DABCO T-12 | 0.6 |
| TOTAL | 100.6 |

|  | J-100 | L-100 | N-100 |
|---|---|---|---|
| Neoprene GW | 8.5 | 8.5 | 8.5 |
| Methyl Naphthalene #5 | 20.67 | 20.67 | 20.67 |
| Limonene 145 | 20.67 | 20.67 | 20.67 |
| Age Rite Stalite S | 0.17 | 0.17 | 0.17 |
| Blue DI-6112 | 10.0 | 10.0 | 10.0 |
| Methyl Naphthalene #5 (Premix) | 1.0 | 6.0 | 12.0 |
| PAPI 2020 (Premix) | 1.0 | 6.0 | 12.0 |
| TOTAL PARTS* | 62.01 | 72.01 | 84.01 |
| Neoprene-PAPI 2020 | 8.85:1.0 | 1.42:1.0 | 0.71:1.0 |
| PINE SOL TEST RESULTS | | | |
| (rubs to failure)- 2 days | 11 | 20 | 12 |
| 12 days | 11 | 20 | 22 |

EXAMPLE XI

NATURAL/SYNTHETIC RUBBER INK BLENDS

|  | A-133 | B-133 | C-133 |
|---|---|---|---|
| SMRL | 1.0 | | |
| Methyl Naphthalene #5 | 10 | 4.0 | |
| PAPI-2020 | 0.33 | 0.23 | 0.19 |
| Blue DI-6112 | 0.1 | 4.0 | 3.33 |
| Isophorone | | 4.0 | |
| D-Limonene | | 4.0 | |
| Cyclohexanone | | 4.0 | 10.0 |
| Neoprene GW | | 4.0 | |
| Hypalon 20 | | | 3.33 |
| Butyl Cellosolve Acetate | | | 3.33 |
| TOTAL PARTS* | 11.43 | 20.23 | 20.17 |

EXAMPLE XI-continued

| Pine-Sol Test (time of cure/rubs to failure) | B-133 | C-133 | G-133 | H-133 |
|---|---|---|---|---|
| 6 Days | 10 | 7 | 6 | 4 |

Hypalon Dupont ™ - Chlorosulphonated Polyurethane Rubber (CSM Rubber)
G = Blend 75% B-133, 25% A-133 = Neoprene/Natural Rubber
H = Blend 75% C-133, 25% A-133 = Hypalon/Natural Rubber
B and C printed over Base G and H no base Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

We claim:

1. A formulation containing rubber, solvent therefor and pigment, for printing an image on a latex rubber surface which is resistant to abrasion and chemical attack, characterized therein that said formulation comprises a mixture of initial components:
    a) a clear coat comprising: natural rubber and a solvent therefor,
    b) a premixed portion comprising: an aromatic hydrocarbon solvent and an aryl diisocyanate integrating agent capable upon cure, of forming a chemically and abrasion resistant, tough flexible structure integrating the rubber of said clear coat with the rubber of said latex surface and
    c) pigment,
    said components being mixed prior to printing the image on said surface.

2. The formulation of claim 1 wherein the clear coat solvent is selected from the group consisting of aromatically unsaturated solvents, terpenes and terpenoids.

3. The formulation of claim 1 wherein the approximate weight of aryl diisocyanate is between 0.5 and 3 times that of the rubber in the ink.

4. The formulation of claim 3 wherein
    a) the clear coat comprises natural rubber 1–10 parts by weight and an aromatic hydrocarbon solvent: 45–55 parts by weight,
    b) the premixed portion comprises: an aromatic hydrocarbon solvent 2–15 parts by weight and the agent is an aryl diisocyanate: 1–30 parts by weight; and
    c) the pigment comprises 0.3–5.0 parts by weight.

5. The formulation of claim 4 wherein the diisocyanate is selected from the group consisting of toluene-, methylene diphenyl- and polymeric methylene diphenyl diisocyanates.

6. The formulation of claim 5 wherein the viscosity of the ink at time of printing is in the range of about 800 to about 3000 cps at 20° C.

7. A formulation containing natural rubber, solvent therefor and pigment, for printing an image on a latex rubber surface which is resistant to abrasion and chemical attack, characterized therein that said formulation comprises as separate components:
    a) a base coat comprising natural rubber, and a solvent for rubber and
    b) an ink comprising natural or synthetic rubber; a solvent for rubber and pigment;
    provided that an aryl isocyanate capable upon cure, of forming a chemically and abrasion resistant, tough flexible structure integrating the rubber of said base coat, the rubber of said ink and the rubber of said latex surface is present in at least one of the base coat and the ink.

8. The formulation of claim 7 wherein the approximate weight of aryl diisocyanate is between 0.5 and 3 times that of the sum of the rubber in the base coat and in the ink.

9. The formulation of claim 8 wherein
    a) the base coat comprises natural rubber: 5–15 parts by weight, a solvent for rubber: 80–120 parts by weight, aryl diisocyanate, as integrating agent: 0–45 parts by weight; and
    b) the ink comprises natural or synthetic rubber 1–10 parts by weight; a solvent for rubber, 30–80 parts by weight; pigment: 0.3–5.0 parts by weight; and aryl diisocyanate, as integrating agent: 0–30 parts by weight; provided that aryl diisocyanate in the above range is present in at least one of the base coat and the ink.

10. The formulation of claim 9 wherein the solvent for rubber is at least one member of the group consisting of an aromatic hydrocarbon, a terpene, a terpenoid or a ketone boiling above 120° C.

11. The formulation of claim 10 wherein, the diisocyanate is selected from the group consisting of toluene-, methylene diphenyl- and polymeric methylene diphenyl diisocyanates and mixtures thereof.

12. The formulation of claim 11 wherein
    a) the base coat comprises, as the solvent for rubber therein, an aromatic hydrocarbon solvent: 60–90 parts by weight, a terpene or terpenoid solvent: 0–60 parts by weight; and
    b) the ink comprises, as the solvent for rubber therein an aromatic hydrocarbon solvent: 30–50 parts by weight and a terpene or terpenoid solvent: 0–30 parts by weight.

13. The formulation of claims 12 wherein
    a) the base coat comprises natural rubber: 5–15 parts by weight; an aromatic hydrocarbon solvent: 80–120 parts by weight; and aryldiisocyanate: 1–45 parts by weight and
    b) the ink comprises synthetic rubber: 1–10 parts by weight; an aromatic hydrocarbon solvent: 30–80 parts by weight; and pigment: 0.3–5 parts by weight.

14. The formulation of claim 12 wherein
    a) the base coat comprises natural rubber: 5–15 parts by weight; and an aromatic hydrocarbon solvent: 80–120 parts by weight and
    b) the ink comprises synthetic rubber: 1–10 parts by weight; an aromatic hydrocarbon solvent: 30–60 parts by weight, pigment: 0.3–5.0 parts by weight: and aryl diisocyanate: 1–30 parts by weight.

15. The formulation of claim 12 wherein
    a) the base coat comprises natural rubber: 5–15 parts by weight; an aromatic hydrocarbon solvent: 80–120 parts by weight and aryl diisocyanate: 1–45 parts by weight and
    b) the ink comprises synthetic rubber: 1–10 parts by weight; an aromatic hydrocarbon solvent: 15–60 parts by weight; a terpene or terpenoid solvent: 5–40 parts by weight; and pigment: 0.3–5.0 parts by weight.

16. The formulation of claim 12 wherein
    a) the base coat comprises natural rubber: 5–15 parts by weight and an aromatic hydrocarbon solvent: 80–90 parts by weight and b) the ink comprises synthetic rubber: 1–10 parts by weight; an aromatic hydrocarbon solvent: 15–60 parts by weight; a terpene or terpenoid solvent: 5–40 parts by weight; pigment: 0.3–5.0 parts by weight, and aryl diisocyanate: 1–30 parts by weight.

17. The formulation of claim 1 wherein the aromatic solvent is commercial grade methyl naphthalene.

18. A method of printing an image on a latex rubber surface which is resistant to abrasion and chemical attack, with a formulation containing natural rubber, solvent therefor and pigment, characterized by preparing an ink by mixing the formulation of claim 1 at ambient temperature and printing the image on said surface with said ink.

19. The method of printing an image on a latex rubber surface which is resistant to abrasion and chemical attack, with a formulation containing natural rubber, solvent therefor and pigment, characterized by preparing an ink by mixing the formulation of claim 2 at ambient temperature and printing the image on said surface with said ink.

20. The method of printing an image on a latex rubber surface which is resistant to abrasion and chemical attack, with a formulation containing natural rubber, solvent therefor and pigment, characterized by preparing an ink by mixing the formulation of claim 4 at ambient temperature and printing the image on said surface with said ink within 10 hours of combining the components of the mixture.

21. The method of printing an image on a latex rubber surface which is resistant to abrasion and chemical attack, with a two part formulation of a base coat comprising natural rubber and solvent therefor and an ink comprising rubber, a solvent therefor and pigment, characterized by applying to said surface a) a base coat coating of claim 7 part a) and b) printing the image onto said base coat with an ink of claim 7 part b).

22. The method of claim 21 wherein the viscosity of the ink at time of printing is in the range of about 800 to about 3000 cps at 20° C.

23. The method of claim 22 wherein the surface is a natural latex rubber surface.

24. The method of claim 21 which comprises allowing said base coat to become tacky before printing with the ink.

25. The method of claim 21 which comprises allowing said base coat to become dry before printing with the ink.

26. The method of claim 21 comprising the additional step of heating the printed surface.

27. The method of claim 26 wherein the heating is carried out in a time and in a temperature range of from 95° to 130° C. for 10 to 20 minutes.

28. The method of claim 28 wherein the heating is carried out in a time and in a temperature range of from 190° to 230° C. for 3 to 8 seconds.

29. The method of claim 21 additionally comprising permitting the printed surface to cure at ambient conditions for from 5–60 days.

30. A rubber latex object having a design printed thereon by the method of claim 18.

31. A rubber latex object having a design printed thereon by the method of claim 21.

32. A natural rubber latex glove in accordance with claim 30.

33. A natural rubber latex glove in accordance with claim 31.

34. A natural rubber latex glove having a design printed thereon by the method of claim 20.

35. A rubber latex glove having a design printed thereon by the method of claim 21.

* * * * *